Aug. 27, 1929.  J. K. LUTHE ET AL  1,725,876
SAFETY DEVICE FOR GAS WATER HEATERS
Filed Nov. 9, 1925

INVENTORS:
JULIUS K. LUTHE
AND ROY W. JOHNSON
BY
Bottum, Hudnall, Secher and McNamara
ATTORNEYS.

Patented Aug. 27, 1929.

1,725,876

UNITED STATES PATENT OFFICE.

JULIUS K. LUTHE AND ROY W. JOHNSON, OF MILWAUKEE, WISCONSIN, ASSIGNORS, BY MESNE ASSIGNMENTS, TO TIME-O-STAT CONTROLS COMPANY, A CORPORATION OF MARYLAND.

SAFETY DEVICE FOR GAS WATER HEATERS.

Application filed November 9, 1925. Serial No. 67,846.

This invention relates to improvements in safety devices and more particularly to a safety device for gas water heaters of the distantly controlled type.

It is now quite common to provide means for operating a gas water heater located in the basement of a building from one or more of the upper floors thereof, this being usually accomplished by provision of a constantly burning pilot light operatively associated with the main burner and a cable, or the like, connected to the main fuel valve adjacent the heater and extending to the point or points of distant control, the valve being opened by a slight pull on the cable, and closed by means of a weight, spring, or some equivalent thereof, upon release of the cable. As is well known, these cables usually pass over one or a series of pulleys. In many instances, this type of control is purely manual, the householder or occupant of the building operating the cable to turn the heater on, and later releasing it to shut the heater off after the desired amount of water has been heated. Other controls of this type incorporate means for automatically shutting off the fuel supply to the heater after a given time has elapsed, or upon a given quantity of water having been heated. One control of the latter character employs a clock at the point or points of control, which may be set to automatically release the cable after the elapse of any desired time interval.

However, in any installations of this general type, wherein a cable is employed to control the flow of fuel to the main burner, there is always danger of said cable becoming jammed in one or more of the pulleys, or movement thereof being otherwise obstructed, in which event the burner would not be shut off upon release of the cable at the point of control. In the control employing a clock for automatically releasing the cable, the same dangerous condition might also arise through failure of the clock.

One object of the present invention, therefore, resides in the provision of safety means in apparatus of the class described which will automatically operate to cut off the flow of fuel to the heater, should the cable control fail, before conditions become dangerous.

Another object is to provide means of the character described which may be readily, quickly and economically installed without necessitating any alteration of the heater, the valve, the storage tank, or in the general arrangement of these various elements.

With these and other objects in view, as will more clearly hereinafter appear, the invention contemplates, briefly, a multipart cable, one part of which remains normally fixed between the valve and a fusible element mounted immediately adjacent the hot water storage tank and subject to the heat thereof, while the other part of the cable is loosely connected to the first intermediate the ends of the latter and extends to the distant point of control. Thus, should the valve fail to close upon release of the cable at the point of control, the gradually increasing heat of the water in the storage tank will melt the fusible element thereby releasing the part of cable first described and permitting the valve to close, thus arresting further operation of the heater.

The various features of the invention will more clearly appear from the embodiment thereof illustrated in the accompanying drawings wherein Figure 1 is a side elevation of a storage tank, gas heater, and other important parts of a water heating system of the storage type, and showing one embodiment of the present invention operatively associated therewith;

Figure 1:
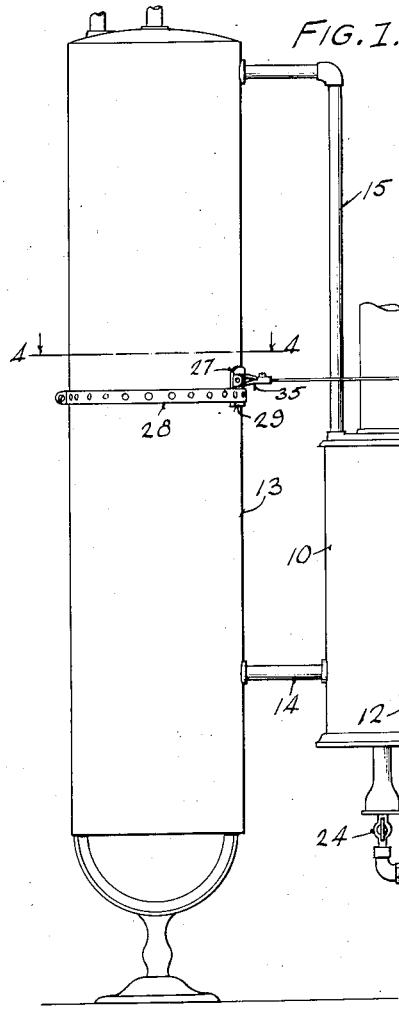
Figure 2:
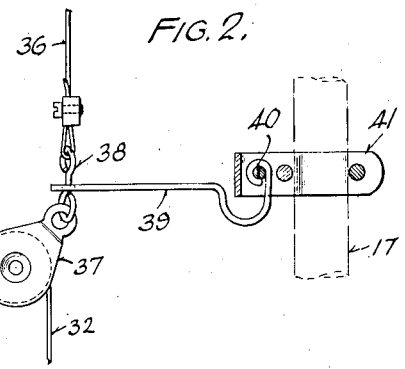
Fig. 2 is an enlarged detail view of the connection between the two parts or sections of cable employed in the present control.
Figure 3:
Fig. 3 is an enlarged plan view of the pivoted guide employed for maintaining the two cables at the point of connection in operative relation.
Figure 4:
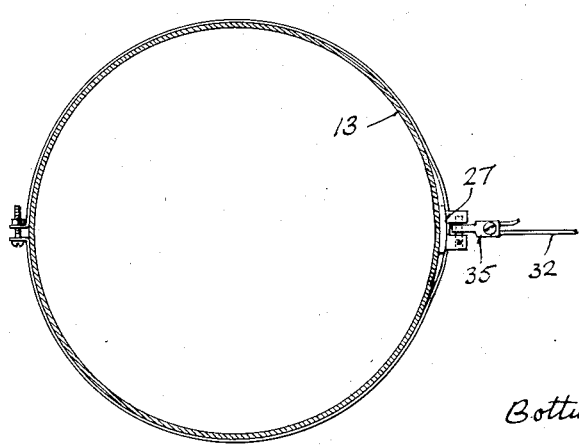
Fig. 4 is a sectional view on the line 4—4 of Fig. 1, showing the fusible element and method of attaching the same to the storage tank.
Figure 5:
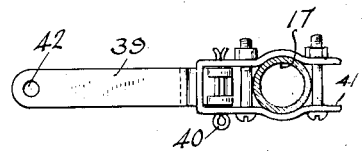
Fig. 5 is an enlarged top elevation, partly in section, of the fusible element supporting member.
Figure 6:
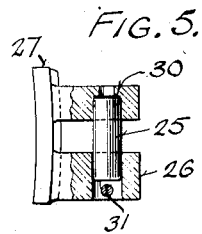
Fig. 6 is a side elevation of the same member.
Figure 7:
Fig. 7 is a perspective view of the fusible element.

Referring more in detail to the drawings, the gas heater bears reference character 10 and is provided with the usual heating coil 11 and burner 12. The storage tank, designated by reference character 13, communicates with the lower end of the coil 11 of the heater through pipe 14, while the upper end of the coil connects with pipe 15 providing the return to the storage tank. The heater is provided with the usual vent pipe 16. The gas supply pipe is shown at 17, and interposed in this pipe in advance of the connection thereof with the main burner 12 of the heater, is a valve 18 of the self-closing type which is operated to open position through a headed plunger 19 by means of a pivoted lever 20, the latter being weighted as at 21 at its free end so as to normally permit the valve to remain closed. Immediately above the valve 18 and communicating with the housing thereof in advance of the valve, there is provided a pilot 22, the outlet end 23 of which is shown projecting through a small opening in the heater casing immediately above the burner 12 and in position to immediately ignite fuel issuing therefrom. The small amount of gas issuing from the pilot is ignited and left burning so as to provide a constantly burning pilot light. The valve and pilot light combination shown in the drawings has been selected purely for purposes of illustration, and not in any way as defining limitations or restrictions upon the invention. In other words, the special type or construction of the valve and pilot light have no bearing whatever upon the utility or applicability of the subject matter of the present invention, any other type or construction of valve and pilot functioning to accomplish the same results, as described in connection with the combination illustrated, serving just as well. The usual hand operated valve, shown at 24 immediately beneath the burner, remains constantly open during the normal functioning of gas heaters of the distantly controlled type, such as the present invention relates to.

Heretofore in gas heaters of the distantly controlled type, such as thus far described, it has been customary to provide a continuous cable extending from the point of control to the lever 20 or other operating member for the main valve, said cable at its lower end having been attached to said lever so that a slight upward pull on the cable at the distant point of control would serve to lift the lever and open the valve, thus permitting fuel to flow to the main burner where it, in turn, would be ignited by the pilot light, a release of the cable being relied upon entirely to shut off the valve by permitting the weight 21 or other actuating means to move the valve member to closing position. As above explained, the cable in such controls may become jammed or otherwise obstructed after being pulled up so that a mere release at the point of control does not permit the valve to close, while in those controls which rely upon a clock or similar mechanism for automatically releasing the cable after a given interval of time, there is the added possibility of failure to shut off the heater due to the possible failure of the clock. In order to provide against such possibilities and the very dangerous conditions oftentimes resulting therefrom, the present invention contemplates the provision of safety means operable upon an excessive degree of heat obtaining in the storage tank to automatically arrest further operation of the heater independently of the distant control.

With this end in view it is proposed, according to the embodiment of the invention illustrated in the drawings, to mount a fusible element 25 immediately adjacent the outer surface of the storage tank 13 so that said element will be subject to the heat of said tank. In the drawings this element is shown in the form of a pin mounted in aligned apertures of lugs 26 formed integrally with a supporting base member 27 adapted to be clamped firmly against the side of the tank 13 by means of a split band or the like 28, the free ends of which are drawn together tightly about the tank by any suitable means, thus providing against slippage or other displacement. As an added safeguard against displacement of the fusible element supporting member 27, the latter is provided with a lug 29 at its lower edge for the purpose of preventing separation of the band 28 and member 27, the distance between the lug 29 and lugs 26 being preferably just sufficient to accommodate the band. The aperture in one of the lugs 26 is reduced in diameter at its outer end to provide a shoulder as shown at 30. This is to prevent displacement of the flexible element outwardly in one direction after it has been positioned in the lugs, while cotter pin 31 is inserted adjacent the outer end of the other aperture to prevent displacement of said element in that direction. Unlike the cable control heretofore employed, and as above described, the fuel valve is operated, according to the present invention, through the instrumentality of a multipart cable. The part which will be first described bears reference character 32 and is connected at one end through means of a coiled spring 33 and an elongated link member 34 with the valve operating lever 20, while at its other end said cable part 32 is connected directly to the fusible element 25 previously described, a hook, link or the like 35 being preferably employed in making this connection. The other part of the cable bears reference character 36 and has a slip connection at its lower end with cable 32 intermediate the ends of the latter. The other end of the section of cable 36 extends upwardly to the distant point of control and, in so doing, usually passes over one or more pulleys (not shown) as previously described. The slip connection between the section of cable 36 and cable part 32 is shown in the drawings in the form of a pulley 37 loosely suspended from a double loop link 38 carried by the end of the section of cable 36. What may be conveniently termed a floating guide is shown at 39 and is in the form of a movable arm pivoted at 40 to an anchoring clamp 41, the latter being shown in the present illustration as rigidly attached to the gas pipe 17. At its outer free end the arm is apertured as at 42 and receives the link 38. By this means the portion of cable section 32 which extends between the pulley 37 and the gas valve is maintained in substantial alignment with the adjacent portion of cable section 36 and in such position as to provide for a direct pull from the cable section 36 through intervening portion of cable section 32 to the valve, substantially the same as though the cable 36 were continuous down to and connected directly to the valve. This alignment or relationship is maintained for all movements of the cable, the arm 39 being free to move up and down with the cable as will be readily understood. Thus, under normal conditions, the operation of the valve is accomplished in substantially the same manner as heretofore, the cable 36 and the part of cable 32 intervening between part 36 and the valve constituting in effect a single direct connection between the point of control and the valve.

Assuming now that cable 36 becomes jammed or movement thereof is otherwise obstructed so that upon release at the point of control no movement of the valve to shut off the flow of fuel to the burner occurs. Under this condition the burner will, of course, continue to operate and heat the water. When the heat of the storage tank becomes excessive at the point where the fusible element is mounted, the latter will fuse or melt, thus releasing the cable section 32, the same slipping through the pulley 37 and permitting the valve to immediately shut off, entirely independent of the cable section 36, and before conditions become dangerous. Of course, once the fusible element has released the cable section 32, the entire control becomes inoperative. However, in order to restore the apparatus to its original operative condition, it is merely necessary, as will be apparent, to place another fusible element in position and to connect the corresponding end of the cable section 32 thereto. The control may then again be operated in the usual way.

It is preferred to construct the fusible element supporting member 27 of brass or other material highly conductive of heat, while the band 28 may be of iron or any other desired material, it performing no function other than as a retainer or clamp for holding the member 27 in operative position. The fusible element may be of any of the well-known alloys commonly employed in such capacities and, of course, its fusing point must be such that it will fuse and release cable section 32 in response to a given degree of heat obtaining in the storage tank.

While the clamp 41, to which the floating guide or arm 39 is pivoted, is shown in the drawings as being attached to the gas pipe, it is desired to explain that this arrangement does not always hold true, depending upon the position of the heater and more especially of the valve with respect to the heater and to the storage tank. In many instances the valve happens to be interposed between the heater and the storage tank and, in such event, it will be found more practical to attach clamp 41 either to pipe 15 or to the vent pipe 16 and, in some instances, it may be necessary to attach the guide in other ways and in other locations. It will be seen, therefore, that the location of this element will depend entirely upon conditions prevailing in the particular installation in hand, this however being fully realized and within the contemplation of the invention.

It will also be obvious that the invention is susceptible of various other changes and modifications without departing from the spirit thereof and, accordingly, it is not desired to limit or restrict the same except where limitations appear in the appended claims.

The invention claimed is:

1. In water heating apparatus, a heater, a pilot light therefor, a valve controlling the flow of fuel to the heater, a storage tank, means controlled from a point removed from said heater for opening said valve, means for closing said valve upon release of said first-named means, said first-named means comprising a multipart cable, and means associated with one of said cable parts for automatically releasing said valve independently of the other said cable part in the event the heat of said tank becomes excessive.

2. In a water heating system of the storage type, a storage tank, a gas heater, a valve for controlling the flow of heat to the latter, and a distant control for said valve, said control comprising a two-part cable, a fusible element adjacent the tank, one cable part connecting with said valve at one end and with said element at the other, the other cable part being loosely connected at one end to the first intermediate the ends of the latter, and at its other end extending to a point of control whereby excessive heating of the tank and the resultant fusing of said element will release said first cable part independently of the second to arrest operation of the heater.

3. In a water heating system of the storage type, a heater and a distant control therefor, said control comprising a two-part cable for controlling the flow of fuel to the heater, and a fusible element normally acting to maintain said cable parts in operative relation, said element upon excessive heating of the water acting to release one of said parts to arrest operation of said heater.

4. In a control for a gas water heater, the combination with a storage tank and the fuel valve of the heater, of a fusible element subject to the heat of the tank, a cable attached to said valve at one end and anchored to said element at its other end, and a second cable having a slip connection with the first intermediate the ends of the latter and extending to a distant point of control whereby said valve may be operated from such point by means of said combined cables, while in the event of failure of said second cable, said fusible element will release said first cable upon an excessive degree of heat obtaining in said tank to thus arrest said heater.

5. In a control for a gas water heater, the combination with a storage tank and the fuel valve of the heater, of a fusible element subject to the heat of the tank, a cable attached to said valve at one end and anchored to said element at its other end, a second cable having a slip connection with the first intermediate the ends of the latter and extending to a distant point of control whereby said valve may be operated from such point by means of said combined cables, while in the event of failure of said second cable, said fusible element will release said first cable upon an excessive degree of heat obtaining in said tank to thus arrest said heater, and means for maintaining that portion of the first cable which extends between said slip connection and said valve in substantial alignment with the adjacent portion of said second cable to provide a direct pull from the latter to said valve.

6. In a control for a gas water heater, the combination with a storage tank and the fuel valve of the heater, of a fusible element subject to the heat of the tank, a cable attached to said valve at one end and anchored to said element at its other end, a second cable having a slip connection with the first intermediate the ends of the latter and extending to a distant point of control whereby said valve may be operated from such point by means of said combined cables, while in the event of failure of said second cable, said fusible element will release said first cable upon an excessive degree of heat obtaining in said tank to thus arrest said heater, and means for maintaining that portion of the first cable which extends between said slip connection and said valve in substantial alignment with the adjacent portion of said second cable to provide a direct pull from the latter to said valve, said last-named means comprising a pivoted arm connected at its free end to said second cable close to said slip connection.

7. In a control for a gas water heater, the combination with a storage tank and the fuel valve of the heater, of a heat-conductive supporting member, means for clamping said member to the exterior of said tank, a fusible pin carried by said member, a cable attached to said valve at one end and anchored to said pin at its other end, a second cable having a pulley connection with the first intermediate the ends of the latter and extending to a distant point of control, and a guide embracing said second cable immediately above said pulley connection for maintaining that portion of the first cable extending between the pulley connection and said valve in substantial alignment with said second cable to provide a direct pull between the latter and said valve, said guide being freely movable in the direction of travel of the cable but being fixed against movement transverse to such direction of travel.

8. In a water heating apparatus, a heater, a valve controlling the flow of fuel to the heater, a storage tank operatively associated with the heater, distant control cable means for the valve, means for closing said valve upon release of said cable means and a heat responsive element operatively associated with said distant control cable means and mounted directly on and subject to the heat of the tank and acting independently of the other elements of the apparatus normally to maintain an operative tension on the distant control cable means, and to break down the operative tension of the distant control cable means to permit the valve to close irrespective to the position of the distant control cable means when the heat of the tank becomes excessive.

9. A mechanism for controlling the burner of a water heating system having a tank for containing the heated water, comprising a station, remote from the burner, an actuator for lighting the burner, a thermally influenced device, associated with the tank, a pulley, a flexible element passing over the pulley and having its ends secured, one to the thermally influenced device, and the other to the actuator, and means extending to the station for raising the pulley.

In witness whereof we hereto affix our signatures.

JULIUS K. LUTHE.
ROY W. JOHNSON.